United States Patent [19]

Ecer

[11] Patent Number: 4,533,815
[45] Date of Patent: Aug. 6, 1985

[54] PROCESS FOR TREATING A BEARING SURFACE TO MODIFY MICROASPERITIES

[75] Inventor: Gunes M. Ecer, Irvine, Calif.

[73] Assignee: Smith International, Inc., Newport Beach, Calif.

[21] Appl. No.: 518,921

[22] Filed: Aug. 1, 1983

[51] Int. Cl.³ .............................................. B23K 27/00
[52] U.S. Cl. ........................ 219/121 LF; 219/121 LE; 219/121 LM; 219/121 L
[58] Field of Search ...... 219/121 L, 121 LE, 121 LF, 219/121 LM, 121 EB, 121 EF, 121 EG, 219/121 PA, 121 PB, 121 P; 148/4, 1.5

[56] References Cited

U.S. PATENT DOCUMENTS

| 3,848,104 | 11/1974 | Locke | 219/121 LE |
| 4,015,100 | 3/1977 | Gnanamuth et al. | 219/121 LE |
| 4,249,960 | 2/1981 | Schnable et al. | 148/1.5 |
| 4,341,569 | 7/1982 | Yaron et al. | 148/1.5 |

OTHER PUBLICATIONS

T. R. Anthony, et al., *Journal of Applied Physics*, "Surface Normalization of Sensitized Stainless Steel by Laser Surface Melting", vol. 49, No. 3, p. 1248, Mar. 1978.

*Primary Examiner*—C. L. Albritton
*Attorney, Agent, or Firm*—Christie, Parker & Hale

[57] ABSTRACT

A bearing surface having microasperities is treated by a process comprising the steps of generating a high density energy beam and producing relative motion between the beam and the bearing surface to define a succession of points at each of which the beam impinges upon the bearing surface for an interaction time during which localized heating occurs and then rapid cooling begins to cause partial melting followed by rapid solidification, that, in the direction normal to the bearing surface extends to a depth less than the microasperity height and that, owing to said relative motion, extends throughout an area of the bearing surface to define a microdimpled surface.

13 Claims, 7 Drawing Figures

PROCESS FOR TREATING A BEARING SURFACE TO MODIFY MICROASPERITIES

BACKGROUND OF THE INVENTION

This invention relates to a process for treating a bearing surface, and particularly relates to such a process that causes partial melting of a bearing surface having microasperities so as to modify the topography of the surface for improved bearing performance.

One type of device for which a need exists to provide a carefully prepared bearing surface is a journal bearing drill bit used for drilling oil wells and the like. A very efficient type of such drill bit is depicted and described in U.S. Pat. No. 4,303,137, entitled "Method For Making A Cone For A Rock Bit And Product." Such a drill bit has a sturdy steel body which is threaded onto the lower end of a drill string and rotated in the hole being drilled. The drill bit has rolling cone cutters mounted on the body of the drill bit so as to rotate as the drill bit is rotated. Each of the rolling cone cutters rotates around a corresponding journal bering that in use is subjected to high radial and thrust loads. As the rolling cone cutters rotate in use, they crush and chip the rock at the bottom of the hole. Such rock drilling is very demanding service and the rock bit must have a rugged construction to withstand this demanding service. During manufacturing of such drill bits, substantial effort is made to prepare the bearing surfaces carefully; this effort is directed to minimizing the risk of premature bearing failure during service.

Each of the journal bearings comprises two relatively moving elements, a journal and a bushing, each of which is carefully machined to reduce friction between the relatively moving surfaces. Such careful machining cannot as a practical matter eliminate all contact between the relatively moving surfaces even when they are lubricated. Furthermore, the machining techniques such as grinding that are commonly used in manufacturing the bearings impart characteristics to the relatively moving surfaces that affect the dynamic friction coefficient of the bearing. One such characteristic is machine line orientation.

In a paper entitled "An Interferometric Study of the EHL of Rough Surfaces," by A. Jackson and A. Cameron, published in ASLE Trans., Vol. 19, No. 1, 1976, pp. 50–60, the authors report their study of the effects that transverse and longitudinal roughness have on EHL film shapes. Briefly, they found that under the same operating conditions, transverse one-dimensional roughness results in thicker oil films than longitudinal one-dimensional roughness.

The foregoing study was extended and conclusions were reported in a paper entitled "Effects of Asperities in Elastohydrodynamic Lubrication," by M. Kaneta and A. Cameron, published in Trans. ASME, Vol. 102, July 1980, pp. 374–379. Briefly, the conclusions were that both in rolling and sliding some asperity tips (i.e., micro protrusions on the journal or bushing surface) on the macro constriction are in a state of near contact when $h/\sigma<2.5$, where h is the central film thickness that would be obtained if the surfaces were smooth, and $\sigma$ is half the asperity height. A state of near contact on every asperity in the contact area is obtained at the condition of $h/\sigma<1.2$.

Because surface roughness and orientation of the machining lines relative to the sliding direction have the foregoing effects on lubricant thickness, they in turn affect bearing life. Furthermore, published results of experiments on friction behavior of surfaces containing artificially produced asperities and dents indicate that there is more to surface topography effect on bearing performance than just surface roughness. These publications include the above-cited paper by Kaneta and Cameron; a paper entitled "Elastohydrodynamic Film Thickness Measurements of Artificially Produced Non-smooth Surfaces," by C. Cusano and L. D. Wedeven, published in ASLE Trans., Vol. 24, 1980, pp. 1–14; and a paper entitled "Microasperity Lubrication," by J. N. Anno, J. A. Walowit, and C. M. Allen, published in Trans. AMSE, J. of Lub. Tech., Vol. 90 (1968), pp. 1–14.

The above-cited paper by Anno et al. reports that surface microasperities in the form of circular cylinders that are $12\times10^{-3}$ inches in diameter and 100 microinches in height have increased the load supporting capability of rotary shaft face-seals. It also reports that the load support is even further increased when the asperity tips are rounded. The above-cited paper by Cusano and Wedeven concerns work on surfaces containing artificially produced circular dents and indicates that $h/\sigma$ values as low as 0.69 did not produce any asperity-to-asperity contact even though, as mentioned above, at such low values of $h/\sigma$ full asperity contact is predicted. This is attributed to the increasing influence of microelastohydrodynamic (EHD) effects (due to micro dents) as the central film thickness, h is reduced.

Another relevant observation made in these papers is the fact that under sliding conditions surface asperities deform significantly as a result of micro-EHD pressure generation. As a consequence, for low values of $h/\sigma$, while a portion of the load supported by the lubricant may be increased by creation of micro-EHD conditions, i.e., fabrication of surfaces containing micro dents and asperities, the tendency to cause fatigue of asperities due to cyclic plastic deformation may be increased. In extreme cases micropitting and microcracking of the mating surfaces can occur. A desirable remedy for this problem is the creation of asperities that are rounded (i.e., no sharp angles to act as stress raisers), harder and under compressive stress. All three of these conditions are classical solutions to suspected metal fatigue problems.

SUMMARY OF THE INVENTION

The present invention is a process for treating a bearing surface having microasperities, and is directed to providing the benefits of lowered surface roughness, disruption of machining lines parallel to sliding direction, creation of hardened and rounded asperities and of surface compressive stress. The process is characterized by partial melting so as to modify the asperities and disrupt machining lines without fully melting the surface.

Generally, the steps of the process include generating a high density beam, preferably by a laser having a power output in excess of 500 watts. The process steps further include producing relative motion between the beam and the bearing surface to define a succession of points at each of which the beam impinges upon the bearing surface for an interaction time during which localized heating occurs and then rapid cooling begins to cause partial melting followed by rapid solidification that, in the direction normal to the bearing surface extends to a depth less than the asperity height and that, owing to said relative motion, extends throughout an area of the bearing surface to define a microdimpled surface.

As indicated above, the partial melting is directed to modify asperities and disrupt machining lines without fully melting the surface, and the interaction time is selected accordingly. Since the depth of the melting is less than the asperity height, the cooling from the melting temperature is extremely rapid and this rapid cooling results in cooling stresses becoming locked into the structure as compressive stress within the modified asperities, thus improving the properties of the bearing surface including its hardness and its resistance to wear and fatigue.

Preferably, the bearing surface is defined by a layer of hard metal deposit covering a steel substrate. In the presently preferred practice of the invention, an adjustable power (800 watts maximum), continuous wave, carbon dioxide laser generates the high density beam which is 1.5 cm. in diameter. The beam passes through a lens with a 12.5 cm. focal length. By adjusting the distance between the lens and the point of impingement of the beam on the bearing surface it is possible to vary the effective diameter of the beam and accordingly control the power density of the incident beam. The bearing surface is defined by a commercially available alloy called Stellite Alloy No. 1 which covers a substrate made of AISI 4815 steel. It is believed that about 20% of the incident energy provided by the laser beam is absorbed by the bearing surface. The absorbed energy per unit area falls within a range of about 90 joules per $cm^2$ to about 3750 joules per $cm^2$. The heat generated as such energy is absorbed is sufficient to vaporize some of the material forming peak portions of the microasperities.

Excellent results can be achieved by relatively positioning the lens and the bearing surface so that the effective beam diameter is about 0.14 cm., and relatively moving the beam and the bearing surface so that the interaction time is about 14 milliseconds. By doing so while the laser is set at 500 watts output, the impinging power density is about 31.5 $Kw/cm^2$, which at 20% absorption, is about 6.3 $Kw/cm^2$, and results in the absorption of about 440 $joules/cm^2$ during the interaction time. In another example producing excellent results, the effective beam diameter is about 0.2 cm, the interaction time is about 400 milliseconds, and the laser is set at 5600 watts output, so that the energy absorbed, at 20% energy transfer, is about 1240 $joules/cm^2$.

BRIEF DESCRIPTION OF THE DRAWINGS

FIG. 4 comprises FIGS. 4A and 4B, each of which is a strip chart recording; FIG. 4A shows surface roughness measured before a blank was treated in accordance with the invention, and FIG. 4B shows surface roughness after this blank was treated in accordance with the invention.

DETAILED DESCRIPTION

Figure 1:
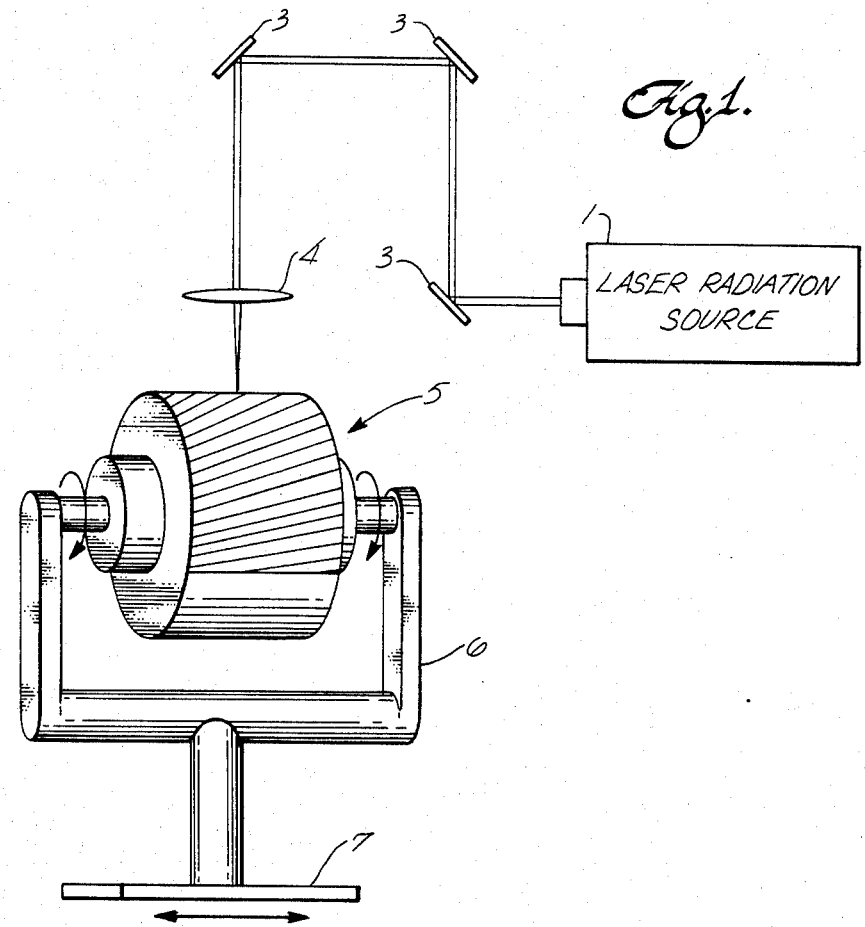
FIG. 1 is a simplified perspective view of an exemplary arrangement for treating a bearing surface in accordance with this invention.

In the arrangement depicted in FIG. 1, a laser radiation source 1 generates a high density energy beam 2 that is reflected by a series of mirrors 3 so as to pass through a lens 4 and then impinge upon the bearing surface of a journal 5. A yoke 6 supports the journal 5 above a carriage 7. By translating carriage 7 and rotating journal 5 about its longitudinal axis, relative motion is produced between the beam and the bearing surface.

Suitably, the laser radiation source 1 is an adjustable power (800 watts maximum), continuous wave carbon dioxide laser. The high density beam it generates has a diameter of 1.5 cm. The distance between the lens 4 and the point on the bearing surface where the beam instantaneously impinges is different from the focal length of lens 4.

The journal being treated in the arrangement of FIG. 1 has undergone preliminary manufacturing steps conventionally performed in the manufacture of journals for journal bearing drill bits. These preliminary manufacturing steps include steps such as grinding or the like that impart to the bearing surface a generally regular pattern of directional lines made up of peaks and valleys ranging in height up to about 100 micrometers and more typically ranging between about 5 and about 30 micrometers.

Figure 2A:
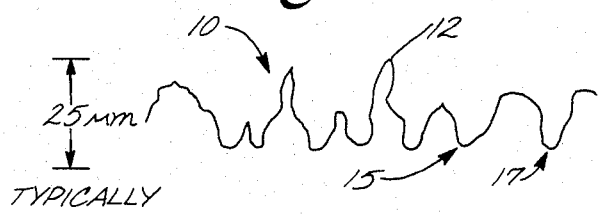
FIG. 2 comprises FIGS. 2A and 2B, which are simplified sketches showing cross sections of a bearing surface before and after treatment in accordance with this invention.

In the simplified sketch of FIG. 2A, there is illustrated the general cross sectional configuration of the bearing surface resulting from the preliminary manufacturing steps, before treatment in accordance with this invention. Microasperity peaks such as those indicated at 10 and 12 form relatively sharp peaks and valleys, such as indicated at 15 and 17, and are somewhat V-shaped.

Figure 2B:
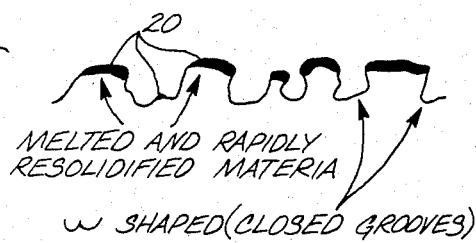

In the simplified sketch of FIG. 2B, there is illustrated the general cross sectional configuration of the bearing surface after treatment in accordance with this invention to modify the microasperities. The tops of the modified microasperities are formed by melted and rapidly resolidified material as indicated at 20, and the valleys have a more rounded shape similar to the Greek letter $\omega$. The characteristics of the surface illustrated in FIG. 2B are highly advantageous. The modification of the microasperities from sharp-peaked to smoother-topped is advantageous because sharp angles tend to act as stress raisers. The melted and rapidly cooled material is hardened and is under compressive stress. The valleys having the more rounded shape, in combination with the disruption of machining lines into a microdimpled surface, provide the characteristics desired to improve lubrication support in use of the bearing.

In operation of the arrangement shown in FIG. 1, the beam impinges on the bearing surface while relative motion is produced between them to define a succession of points at each of which the beam impinges on the bearing surface for an interaction time. For each such point, the interaction time is equal to the ratio of the effective beam diameter to the speed of relative motion. The interaction time, the amount of energy absorbed per unit area by the bearing surface, and certain physical properties of the bearing surface determine the extent of the surface modification.

The energy transfer, i.e., the amount of energy absorbed as a percentage of impinging energy, depends on numerous factors. These factors include the optical reflectivity of the bearing surface as a function of temperature, angle of impingement of the beam, occurrence of any chemical reactions, such as oxidation, evaporation, etc., while the beam produces heating, and the composition of the ambient atmosphere. These factors further include physical properties such as density, heat capacity, and thermal conductivity of the bearing surface.

For high performance bearings as to which this invention provides an advantageous surface treating process, the bearing surface comprises high hardness material, preferably an alloy used in hard facing of steel substrate.

In carrying out the process of this invention to treat a bearing surface defined by such high hardness material, the power density of the beam is in the range of about 15,000 watts/cm$^2$ to about 1,500,000 watts/cm$^2$, the effective beam diameter is in the range of about 200 micrometers to about 2029 micrometers, the interaction times are in the range of about 0.4 milliseconds to about 2.5 seconds, and the absorbed energy per unit area is about 90 joules/cm$^2$ to about 3750 joules/cm$^2$, where the energy transfer is about 20%.

Figure 3:
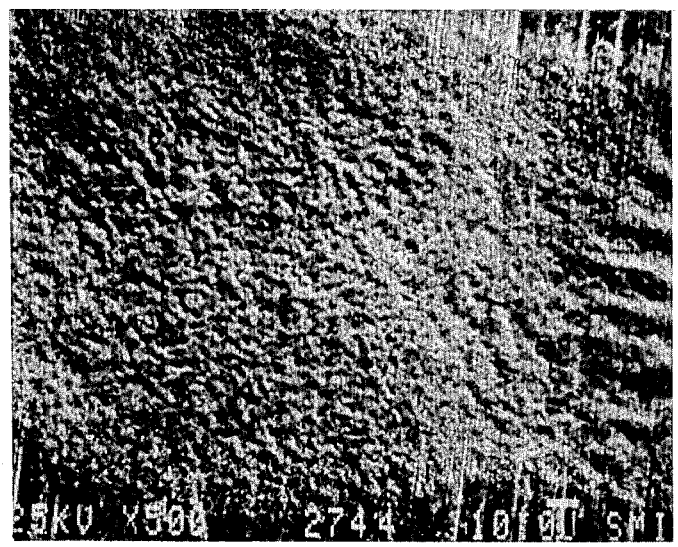
FIG. 3 is a copy of a photograph produced by a scanning electron microscope, and shows an example of a microdimpled surface of a blank simulating a bearing surface of the type suitable for treatment by the process of this invention.
Figure 3A:
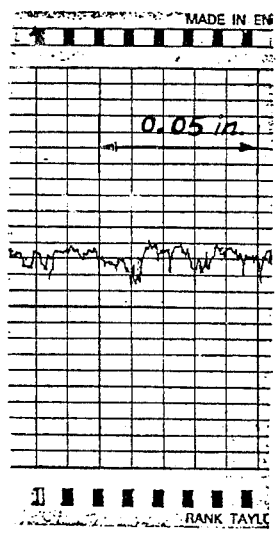
Figure 3B:
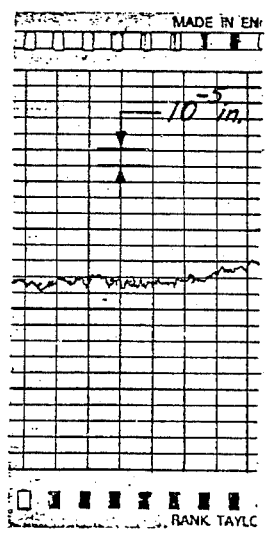
Figure 5:
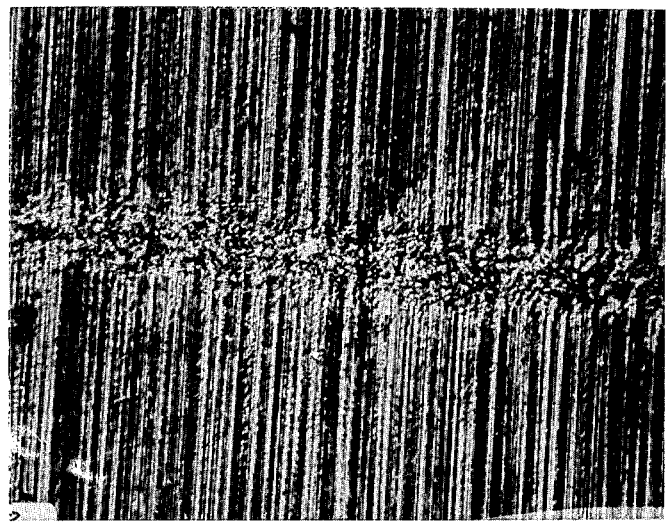
FIG. 5 is a reproduction of a scanning electron microscope photograph of a blank treated in accordance with the invention.

The surface of the simulated blank shown in FIG. 3, and the surface of the simulated blank shown in FIG. 5, each resulted from treating a corresponding blank having an AISI steel substrate and a hard surfacing alloy layer sold under the trade name Stellite Alloy No. 1. Table I below sets out nominal chemical compositions of these materials.

TABLE I

| Element | Composition, Weight Percent | |
| --- | --- | --- |
|  | AISI 4815 Steel | Hard Surfacing Alloy |
| Carbon | 0.16 | 2.5 |
| Manganese | 0.50 | 1.0 Max. |
| Silicon | 0.22 | 1.0 |
| Nickel | 3.50 | 3.0 Max. |
| Molybdenum | 0.25 | 1.0 Max. |
| Iron | Balance | 3.0 Max. |
| Tungsten | — | 12.5 |
| Chromium | — | 30.0 |
| Cobalt | — | Balance |

The blank was mounted on the carriage of a conventional programmable positioner capable of moving in all three dimensions, and irradiated by a laser beam generated and brought to a focus. The angle of incidence of the beam was 90°. In treating the blank shown in FIG. 3, the distance between the lens and the blank was such that the effective beam diameter was 2029 micrometers. The laser power was set at 500 watts, and the carriage velocity was set at 0.5 cm/sec. This provided an interaction time of 400 milliseconds, and an estimated energy per unit area absorption of 1240 joules/cm$^2$ at a 20% energy transfer.

The relative motion between the beam and the blank was such as to subject a portion of the surface of the blank to laser treatment, and to avoid treating top and bottom strips. As a result, the treated blank provides an indication for comparing untreated and treated areas. The untreated strips show machine lines and the treated portion shows the microdimpled surface resulting from modification of microasperities and disruption of the machining lines. The scanning electron microscope photograph provides a 500 X enlargement.

A conventional, highly sensitive roughness measuring apparatus was used to produce strip chart recordings of the deflection of a stylus moving across the surface of the blank, before and after treatment. FIGS. 5A and 5B show the improvement in surface roughness resulting from treatment.

In treating the blank shown in FIG. 5, the distance between the blank and the lens was such that the effective beam diameter was 1420 micrometers. The laser power was set at 500 watts, and the carriage velocity was set at 10 cm/sec. This provided an interaction time of about 14 milliseconds and an estimated energy per unit area absorption of about 440 joules/cm$^2$ at a 20% energy transfer.

This scanning electron microscope photograph provides a 130 X enlargement, and the machining lines are visible above and below the trace of microdimpled surface resulting from the laser treatment.

What is claimed is:

1. A process for treating a bearing surface for elastohydrodynamic lubrication, the bearing surface having microasperities for retaining lubricant, which comprises:

generating a high density energy beam; and producing relative motion between the beam and the bearing surface to define a succession of points at each of which the beam impinges upon the bearing surface for an interaction time during which localized heating occurs and then rapid cooling begins to cause partial melting followed by rapid solidification that, in the direction normal to the bearing surface extends to a depth less than the microasperity height and that, owing to said relative motion, extends throughout an area of the bearing surface to define a microdimpled surface having rounded microasperities with residual compressive stress for retaining lubricant and enhancing resistance to wear and fatigue.

2. A process according to claim 1, wherein the high density energy beam is a laser beam.

3. A process according to claim 2, wherein the laser beam is produced by a laser having a power level of at least 500 watts.

4. A process according to claim 1, wherein the laser beam has a power density of at least 100 watts/cm$^2$ at the point of impingement on the bearing surface.

5. A process according to claim 1, wherein the bearing surface is defined by a layer of hard metal deposit covering a steel substrate.

6. A process for treating a bearing surface defined by a layer of hard metal deposit comprising an alloy containing chromium, tungsten, iron, nickel, and carbon having microasperities, which comprises:

generating a high density energy beam; and producing relative motion between the beam and the bearing surface to define a succession of points at each of which the beam impinges upon the bearing surface for an interaction time during which localized heating occurs and then rapid cooling begins to cause partial melting followed by rapid solidification that, in the direction normal to the bearing surface extends to a depth less than the microasperity height and that, owing to said relative motion, extends throughout an area of the bearing surface to define a microdimpled surface.

7. A process according to claim 6, wherein the beam is produced by a laser beam that during said interaction time has an incident energy of between about 90 joules/cm$^2$ to about 3750 joules/cm$^2$.

8. A process for treating a hard facing alloy bearing surface having microasperities having an average height of less than about 100 micrometers and which are generally regularly oriented in a pattern of machining lines, the process comprising:

generating a laser beam by a laser having an output power in excess of at least about 100 watts;

passing the generated beam through an optical system to produce an effective beam diameter in the range of about 200 microinches to about 2029 microinches; and producing relative motion between the beam and the bearing surfaces to define a succession of points at each of which the beam having said effective beam diameter impinges upon the bearing surface for an interaction time in the range of about 0.4 milliseconds to about 1.5 seconds, during which interaction time localized heating occurs and then rapid cooling begins to cause partial melting followed by rapid solidification that, in the direction normal to the bearing surface extends to a depth less than the microasperity height and that, owing to said relative motion, extends throughout an area of the bearing surface to define a microdimpled surface.

9. A process according to claim 8, wherein the hard facing alloy covers a steel substrate.

10. A process according to claim 9, wherein the hard facing alloy includes chromium, tungsten, iron, nickel, and carbon.

11. A process according to claim 10, wherein the composition of the hard facing alloy by approximate weight is 30% chromium, 12.5% tungsten, 3% iron, 3% nickel, 2.5% carbon, and smaller percentages of manganese, silicon, and molybdenum.

12. A process according to claim 9, wherein the hard facing alloy absorbs about 20% of the energy impinging on it so that the absorbed energy per unit area is in the range of about 90 joules/cm$^2$ to about 3750 joules/cm$^2$.

13. A process according to claim 8, wherein the localized heating raises the temperature of peak portions of the microasperities sufficiently to vaporize some of the material forming the peak portions.

* * * * *